3,424,819
FORMALDEHYDE POLYMERS STABILIZED WITH TRIS(DIALKYLHYDROXYBENZYL)BENZENES
Richard Green, Livingston, N.J., assignor to Tenneco Chemicals, Inc., a corporation of Delaware
No Drawing. Filed Aug. 26, 1965, Ser. No. 482,896
U.S. Cl. 260—857
Int. Cl. C08g 51/60, 51/54, 37/04

9 Claims

ABSTRACT OF THE DISCLOSURE

Formaldehyde homopolymers and copolymers are stabilized against thermal degradation by incorporating therein a tris(dialkylhydroxybenzyl)benzene, such as 1,3,5 - trimethyl - 2,4,6 - tris(3,5 - ditert butyl - 4 - hydroxybenzyl)benzene, alone or in combination with a nitrogen-containing compound, such as a superpolyamide or an amidine compound.

---

This invention relates to the stabilization of polyacetal resins. More particularly, it relates to the stabilization of high molecular weight polymers of formaldehyde. This invention, which provides polyacetal resin compositions having improved stability, is based on the discovery that certain polynuclear polyphenols when incorporated in high molecular weight polymers of formaldehyde, particularly in conjunction with other stabilizers, are remarkably effective in improving the thermal and oxidative stability of the formaldehyde polymers.

Recent advances in polymer process technology have made commercially available high molecular weight polyacetal resins. These polyacetal resins which include the homopolymers, copolymers, and terpolymers of formaldehyde, are thremoplastic resins which upon stabilization may be fabricated into films, filaments, fibers, rods, and tubes. Because of the inherent instability of the polyacetals such as polyoxymethylene glycol, to oxidative and hydrolytic cleavage of the polymer chains and to thermal degradation, these polymers generally require stabilization, either by the further reaction of the hydroxyl-terminated polymer by acetylation, etherification, cyanoethylation, or cross-linking to convert the hydroxyl groups to more stable groups, by controlled degradation of the polymer chain until an end group is reached which is inert to further chemical or physical degradation; by the incorporation in the polymer composition of a stabilizer or stabilizer system which promotes the stabilization of the polymer against oxidative, hydrolytic, and thermal degradation; or by employing a combination of these techniques.

Using a large number of high molecular weight polymers of formaldehyde, including both linear and branched-chain homopolymers and copolymers, it has been found in all instances that the incorporation in the formaldehyde polymer of certain polynuclear polyphenols is remarkably effective in improving the stability of the formaldehyde polymer. Moreover, when these polyphenols are used with other stabilizers, for example, with superpolyamides, in formaldehyde polymers, the stability of the resulting polyacetal compositions is much greater than can be obtained when any of these stabilizers is used by itself. The stabilizer systems containing these polyphenols can be used to stabilize any polyacetal composition containing a high molecular weight polymer of formaldehyde.

As used herein, the term "high molecular weight polymer of formaldehyde" includes linear, branched-chain, and cross-linked homopolymers, copolymers, and terpolymers of formaldehyde having molecular weights in the range of about 10,000 to 200,000 and melting points above 150° C., the predominant structural feature of these polymers being the recurring oxymethylene units ($-OCH_2-$) in the polymer chain. Among the most important of the homopolymers are $\alpha,\omega$-polyoxymethylene glycol, polyoxymethylene carboxylates, such as the polyacetates and polypropionates, and polyoxymethylene ethers, such as the methyl, ethyl, and $\beta$-hydroxyethyl ethers. The formaldehyde copolymers include linear, branched-chain, and cross-linked polymers in which the oxymethylene units in the polymer chain are interspersed with oxyalkylene units containing two or more vicinal carbon atoms or with other units introduced by copolymerizing other monomers, such as $\gamma$-butyrolactone, acrylamide, acrylonitrile, phthalide, or isocyanic acid, with substantially anhydrous formaldehyde or trioxane. The formaldehyde polymers also include linear and branched-chain terpolymers, such as those obtained by polymerizing trioxane with a monocyclic ether, such as 1,3-dioxolane, and a dicyclic ether, such as pentaerythritol diformal. Among the formaldehyde copolymers and terpolymers that may be stabilized in accordance with this invention are those described and claimed in copending patent applications Ser. No. 293,844, which was filed on July 9, 1963, by Henri Sidi now Patent No. 3,300,445; Ser. No. 293,845, which was filed on July 9, 1963, by Henri Sidi now Patent No. 3,293,218; Ser. No. 294,154, which was filed on July 10, 1963, by Roy T. Gottesman and Richard E. Reynolds now abandoned; Ser. No. 294,178, which was filed on July 10, 1963, by Roy T. Gottesman, Henri Sidi, and Robert H. Barth now Patent No. 3,293,219; Ser. No. 389,196, which was filed on Aug. 12, 1964, by Henri Sidi now Patent No. 3,372,146; and Ser. No. 392,899, which was filed on Aug. 28, 1964, by Henri Sidi now Patent No. 3,384,620.

The polynuclear polyphenols that are used to stabilize high molecular weight polymers of formaldehyde in accordance with this invention are those having a benzene ring which is substituted with three 3,5-dialkyl-4-hydroxybenzyl radicals and with three alkyl radicals. These compounds have the structure

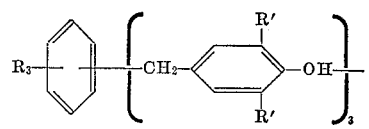

wherein each R and R' represents an alkyl radical having from 1 to 8 carbon atoms. Since compounds having hindered phenolic hydroxyl groups are most satisfactory as stabilizers, it is preferred that at least one and preferably both of the alkyl substituents R' have from 3 to 8 carbon atoms and be branched on the alpha carbon atoms. Ilustrative of these compounds are 1,2,4-trimethyl - 3,5,6 - tris (3 - methyl - 5 - isopropyl - 4 - hydroxybenzyl) benzene, 1,2,5 - triethyl - 3,4,6 - tris (3,5-diisopropyl - 4 - hydroxybenzyl) benzene, 1,2,4-tripropyl-3,5,6-tris (3-ethyl-5-tert. butyl-4-hydroxybenzyl) benzene, 1,2,4-trioctyl-3,5,6-tris (3-hexyl-5-tert. amyl-4-hydroxybenzyl) benzene, and the like.

In general the symmetrical hexasubstituted benzenes are the most effective stabilizers for formaldehyde polymers. These compounds are 1,3,5-trialkyl-2,4,6-tris (3,5-dialkyl-4-hydroxy-benzenes) having the structure

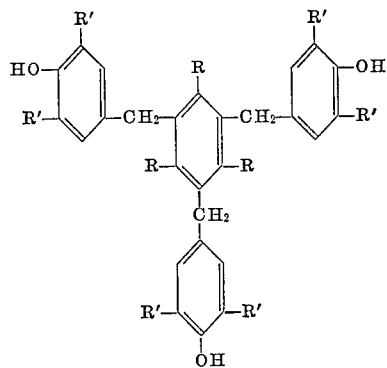

wherein each R and R' represents an alkyl group having from 1 to 8 carbon atoms. In a preferred embodiment of this invention, each R is an alkyl radical which has from 1 to 4 carbon atoms and each R' is an alkyl radical which has from 3 to 8 carbon atoms and which is branched on the alpha carbon atom. Examples of these compounds are 1,3,5-trimethyl-2,4,6-tris (3,5-diisopropyl-4-hydroxybenzyl) benzene, 1,3,5-triethyl-2,4,6-tris (3,5-di-tert. amyl-4-hydroxybenzyl) benzene, 1,3,5-tributyl-2,4,6-tris (3-isopropyl-5-tert. amyl-4-hydroxybenzyl) benzene, and 1,3,5-tripropyl-2,4,6-tris (3,5-di-tert. octyl-4-hydroxybenzyl) benzene. A single polynuclear polyphenol or a mixture of these compounds can be used in the practice of this invention.

The polynuclear polyphenols can be prepared by any suitable and convenient procedure. For example, they may be prepared by alkylating a trialkylbenzene with a 3,5-dialkyl-4-hydroxybenzyl alcohol under alkylating conditions and in the presence of sulfuric acid or a Friedel-Crafts catalyst.

Only very small amounts of the polyphenols are required to stabilize the formaldehyde polymers, with concentrations as low as 0.1 percent by weight, based on the weight of the formaldehyde polymer, having been found to be effective. There appears to be no advantage in using more than about 30 percent by weight of the polyphenol stabilizer. In general about 0.5 percent to 20 percent of the polyphenol, based on the weight of the formaldehyde polymer, is sufficient to stabilize most high molecular weight polymers of formaldehyde.

Accordingly the invention provides a stabilized polyacetal resin composition comprising a high molecular weight polymer of formaldehyde having a molecular weight in the range of about 10,000 to 200,000 and a melting point above 150° C. and a stabilizer system comprising about 0.1 percent to 30 percent by weight, based on the weight of the formaldehyde polymer, of a poly nuclear polyphenol having a benzene ring substituted with three 3,5-dialkyl-4-hydroxybenzyl radicals and with three alkyl radicals, each of said alkyl radicals having from 1 to 8 carbon atoms.

While these polyphenols may be used as the sole stabilizer in a polyacetal resin composition in accordance with this invention, their effectiveness is enhanced when they are used in a stabilizer system that also contains a nitrogen-containing compound, such as superpolyamide or an amidine compound.

The superpolyamides that may be present in the stabilizer system are those which are formed by the condensation of dicarboxylic acids with diamines or by the polymerization of ω-aminomonocarboxylic acids. These superpolyamides have a degree of polymerization in the range of about 100 to 200, and they preferably have melting points below about 220° C. Among the superpolyamides that may be used in the stabilizer systems to stabilize high molecular weight formaldehyde polymers in accordance with this invention are the condensation products of the following diamines and dicarboxylic acids:

pentamethylenediamine/malonic acid,
pentamethylenediamine/pimelic acid,
hexamethylenediamine/adipic acid,
hexamethylenediamine/sebacic acid,
N,N'-hydroxymethylhexamethylenediamine/adipic acid,
N,N'-methoxymethylhexamethylenediamine/adipic acid,
octamethylenediamine/suberic acid,
1,1,6,6-tetramethylenehexamethylenediamine/sebacic acid,
decamethylenediamine/sebacic acid,
dodecanemethylenediamine/2,2,5,5-tetramethyladipic acid, and
2,5-dimethylpiperazine/glutaric acid.

Alternatively, the stabilizer system may contain superpolyamides which are the products obtained by polymerizing an ω-aminomonocarboxylic acid, such as 6-aminocaproic acid, 9-aminonoanoic aicd, 11-aminoundecanoic acid, or its lactomer superpolyamides which are copolymers or terpolymers.

A wide variety of amidine compounds can be used in the stabilizer systems of this invention. These include cyanoguanidine and substituted cyanoguanidines in which the substituents are alkyl, phenyl, hydroxymethyl, chloromethyl, and chlorophenyl groups, for example, 1-cyano-3-methylguanidine, 1-cyano-3-dodecyl guanidine, 1-cyano-3,3-diphenylguanidine, 1-cyano-3-hydroxymethyl guanidine, 1-cyano-3-(m-chlorophenyl) guanidine, and 1-cyano-3-(chloromethyl) guanidine. Another group of useful amidine compounds are the polyaminotriazoles, which are obtained by heating a dihydrazide of a dicarboxylic acid having from 8 to 14 carbon atoms, such as sebacic acid, azelaic acid, suberic acid, adipic acid, decanedioic acid, undecanedioic acid, isophthalic acid, phenylene diacetic acid, and norpinic acid with aqueous hydrazine hydrate, and which have structural units of the formula

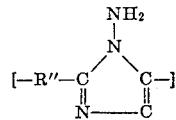

wherein R" represents a divalent organic radical that is the residue of one of the aforementioned dicarboxylic acids. Amino-substituted s-triazines constitute another useful class of amidine compounds. Illustrative of these compounds are 2,4-diamino-6-phenyltriazine, 2,4-diamino-6-methyltriazine, 2,4-diamino-6-chlorotriazine, 2,4-diamino-6-mercaptotriazine, 2,4-dihydroxy-6-aminotriazine, 2,4,6-triaminotriazine (melamine), phenylmelamine, N,N-dialkylmelamine, N,N - diphenylmelamine, and the like. Compounds with an imidazoline nucleus constitute still another suitable class of amidine compounds. These compounds have the formula

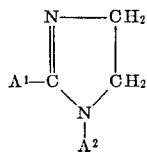

wherein $A^1$ and $A^2$ are monofunctional radicals. An especially useful class of compounds are those in which $A^1$ is a long chain aliphatic hydrocarbon group, such as an alkyl group, a monoolefinic group, or a diolefinic group and $A^2$ is a short chain radical, such as 2-aminoethyl or 2-hydroxyethyl.

The amount of the nitrogen-containing compound that is used in the stabilizer system may be varied over a wide range. Generally about 0.01 percent to 50 percent by weight, based on the weight of the formaldehyde polymer, is used with particularly satisfactory results being obtained when the amount used is 0.05 percent to 3 percent by weight, based on the weight of the formaldehyde polymer.

Although the optimum concentration ranges which are described above for the polyphenol and nitrogen-containing compound have been found to be effective in improving the thermal and oxidative stability of those high molecular weight polymers of formaldehyde which were tested, it should be realized that the actual amount of each component used in the stabilizer system is dependent to a large extent upon the structure and chemical composition of the formaldehyde polymer. For example, if the formaldehyde polymer has been chemically stabilized, such as by acetylation, etherification, or cross-linking to block the terminal hydroxyl groups, a lower concentration of the stabilizer system may be used. Notwithstanding the degree of chemical stabilization in the formaldehyde polymer, however, it is possible to improve the stability of the polyacetal resin compositions by using these stabilizer systems, that is, systems that contain at least one each of the aforementioned polynuclear polyphenols and nitrogen-containing compounds.

Accordingly, the invention provides an improved thermally stable polyacetal resin composition comprising a high molecular weight polymer of formaldehyde having a molecular weight in the range of about 10,000 to 200,000 and a melting point above 150° C. and a stabilizer system comprising (a) about 0.1 percent to 30 percent by weight, based on the weight of the formaldehyde polymer, of a polynuclear polyphenol having a benzene ring substituted with three 3,5-dialkyl-4-hydroxybenzyl radicals and with three alkyl radicals, each of said alkyl radicals having from 1 to 8 carbon atoms, and (b) about 0.01 percent to 50 percent by weight, based on the weight of the formaldehyde polymer, of a nitrogen-containing compound selected from the group consisting of (1) superpolyamides formed by the polymerization of ω-aminomonocarboxylic acids, (2) superpolyamides formed by the condensation of dicarboxylic acids with diamines, (3) cyanoguanidine, (4) substituted cyanoguanidines wherein the substituent is lower alkyl, phenyl, hydroxymethyl, chloromethyl, or chlorophenyl, (5) polyaminotriazoles, (6) amino-substituted s-triazines, (7) imidazolines, and (8) mixtures thereof.

The stabilizers may be incorporated into the polyacetal resin compositions of this invention by any convenient procedure. For example, the stabilizer components may be dissolved in a volatile solvent, such as a ketone, lower alkanol, or chlorinated hydrocarbon, the resulting solution (or solutions of the individual components) added to the formaldehyde polymer in an amount that is sufficient to provide the desired amounts of the stabilizer components in the polyacetal resin composition, and the resulting mixture heated to remove the solvent by evaporation. Alternatively, the stabilized polyacetal resin compositions of this invention can be prepared by milling the stabilizer components together with the formaldehyde polymer or by dissolving both the stabilizer components and the formaldehyde polymer in a common solvent and removing the solvent by evaporation.

This invention is further illustrated by the examples that follow.

Example 1

A series of polyacetal resin compositions was prepared by the following procedure: To one part by weight of polyoxymethylene polyacetate having a molecular weight of about 30,000 as determined by viscometric techniques was added either 2 parts by weight of a 1 percent solution in acetone of 1,3,5-trimethyl-2,4,6-tris (3,5-di-tert. butyl-4-hydroxybenzyl) benzene, 2 parts by weight of a 1 percent solution in acetone of a superpolyamide which is a terpolymer of about 38 percent polycaprolactam/35 percent polyhexamethylene adipamide/27 percent polyhexamethylene sebacamide, or a mixture of 1.5 parts by weight of a 1 percent solution in acetone of said superpolyamide and 0.3 part by weight of a 1 percent solution in acetone of 1,3,5-trimethyl-2,4,6-tris (3,5-di-tert. butyl-4-hydroxybenzyl) benzene. Each of the resulting polyacetal resin compositions was air-dried to remove the acetone. The heat stability of the compositions was determined by measuring the loss in weight that each underwent on being heated at 222° C. in air for 30 minutes. The results of these tests are summarized in Table I.

TABLE I

| Ex. No. | Stabilizer | Percent weight loss |
|---|---|---|
| 1A | 1.5% superpolyamide. 0.3% 1,3,5-trimethyl-2,4,6-tris (3,5-di-tert. butyl-4-hydroxybenzyl) benzene. | 0.77 |
| 1B | 2% 1,3,5-trimethyl-2,4,6 tris (3,5-di-tert. butyl-4-hydroxybenzyl) benzene. | 7.8 |
| 1C | 2% superpolyamide | 19.5 |
| 1D | None | 44.5 |

Example 2

To one part by weight of a trioxane-1,3-dioxolane copolymer having about 4.5 percent by weight of its monomeric units derived from 1,3-dioxolane and having an inherent viscosity of 1.8 after recrystallization from hot dimethylformamide was added 1 part by weight of a 1 percent solution in acetone of either 1,3,5-trimethyl-2,4,6-tris (3,5-di-tert. butyl-4-hydroxybenzyl) benzene or a comparative phenolic stabilizer, 4,4'-butylidene bis (3-methyl-6-tert. butylphenol). Following removal of the acetone by air-drying, the stability of each of the compositions was determined by the procedure described in Example 1. The results of these tests are summarized in Table II.

TABLE II

| Ex. No. | Stabilizer | Percent weight loss |
|---|---|---|
| 2A | 1% 1,3,5-trimethyl-2,4,6-tris (3,5-di-tert. butyl-4hydroxybenzyl) benzene. | 1.4 |
| 2B | 1% 4,4'-butylidene bis (3-methyl-6-tert. butylphenol). | 2.0 |
| 2C | None | 19.8 |

Example 3

Portions of a trioxane-1,3-dioxolane copolymer having 4.0 percent by weight of its monomeric units derived from 1,3-dioxolane and having an inherent viscosity of 1.8 after hydrolytic degradation were mixed with stabilizers, extruded through a dual screw extruder at 200° C., and pelletized. The stability of the resulting compositions was determined by measuring the weight loss that the pellets underwent on being heated in air at 222° C. for 30 minutes as well as by measuring their melt viscosities (using Brabender Plastograph 220° C., 2.5 minute torque) both before and after extrusion. The compositions were molded into tensile bars which were exposed to steam at 135° C. for various lengths of time. The stabilizers used and the results of the tests are summarized in Table III.

TABLE III

| | Composition | | |
|---|---|---|---|
| | A | B | C |
| Stabilizer | 0.5% 1,3,5-tri-methyl-2,4,6-tris (3,5-di-tert. butyl-4-hydroxybenzyl) benzene, 1.0% superpolyamide [1] | 0.5% 1,3,5-tri-methyl-2,4,6-tris (3,5-di-tert. butyl-4-hydroxybenzyl) benzene, 0.2% superpolyamide [1] | 0.7% dicyandiamide, 1.0% 2,2'-methylene bis (4-methyl-6-tert. butylphenol) |
| Percent weight loss | 0.4 | 0.5 | 1.0 |
| Melt viscosity: | | | |
| Before extrusion | 1,700 | 1,280 | 1,700 |
| After extrusion | 1,460 | 1,040 | 1,230 |
| Tensile strength of molded bars: | | | |
| 0 hr. steam exposure | 8,500 | 8,700 | 8,500 |
| 24 hrs. steam exposure | 8,200 | 8,400 | 8,100 |
| 48 hrs. steam exposure | 8,000 | 8,300 | 8,000 |
| 72 hrs. steam exposure | 7,900 | 8,300 | 7,900 |
| Percent elongation of molded bars: | | | |
| 0 hr. steam exposure | 68 | 70 | 68 |
| 24 hrs. steam exposure | 70 | 65 | 67 |
| 48 hrs. steam exposure | 56 | 60 | 62 |
| 72 hrs. steam exposure | 52 | 50 | 50 |

[1] Terpolymer of about 38% caprolactam/35% polyhexamethylene adipamide/27% polyhexamethylene sebacamide.

Each of the other polynuclear polyphenol stabilizers disclosed herein may also be used alone or in combination with a nitrogen-containing compound to stabilize polyacetal resin compositions.

The terms and expressions which have been employed are used as terms of description and not of limitation, and there is no intention in the use of such terms and expressions of excluding any equivalents of the features shown and descriped or portions thereof, but it is recognized that various modifications are possible within the scope of the invention claimed.

What is claimed is:

1. A stabilized polyacetal resin composition comprising a high molecular weight polymer of formaldehyde having a molecular weight in the range of about 10,000 to 200,000 and a melting point above 150° C. and a stabilizer system comprising about 0.1 percent to 30 percent by weight, based on the weight of the formaldehyde polymer, of a polynuclear polyphenol having a benzene ring which is substituted with three 3,5-dialkyl-4-hydroxybenzyl radicals and with three alkyl radicals, each of said alkyl radicals having from 1 to 8 carbon atoms.

2. A stabilized polyacetal resin composition comprising a high molecular weight polymer of formaldehyde having a molecular weight in the range of about 10,000 to 200,000 and a melting point above 150° C. and a stabilizer system comprising 0.5 percent to 20 percent by weight, based on the weight of the formaldehyde polymer, of a polynuclear polyphenol having a benzene ring which is substituted with three 3,5-dialkyl-4-hydroxybenzyl radicals and with three alkyl radicals, each of said alkyl radicals having from 1 to 8 carbon atoms.

3. A polyacetal resin composition according to claim 2 wherein the stabilizer system comprises a polynuclear polyphenol having a benzene ring which is substituted with three 3,5-dialkyl-4-hydroxybenzyl radicals, at least one of said alkyl radicals having from 3 to 8 carbon atoms and being branched on the alpha carbon atom, and with three alkyl radicals, each of said alkyl radicals having from 1 to 4 carbon atoms.

4. A polyacetal resin composition according to claim 2 wherein the polynuclear polyphenol is 1,3,5-trimethyl-2,4,6-tris (3,5-di-tert. butyl-4-hydroxybenzyl) benzene.

5. A stabilized polyacetal resin composition comprising a high molecular weight polymer of formaldehyde having a molecular weight in the range of about 10,000 to 200,000 and a melting point above 150° C, and a stabilizer system comprising (a) about 0.1 percent to 30 percent by weight, based on the weight of the formaldehyde polymer, of a polynuclear polyphenol having a benzene ring which is substituted with three 3,5-dialkyl-4-hydroxybenzyl radicals and with three alkyl radicals, each of said alkyl radicals having from 1 to 8 carbon atoms, and (b) about 0.01 percent to 50 percent by weight, based on the weight of the formaldehyde polymer, of a nitrogen-containing compound selected from the group consisting of (1) superpolyamides formed by the polymerization of ω-aminomonocarboxylic acids, (2) superpolyamides formed by the condensation of dicarboxylic acids with diamines, (3) cyanoguanidine, (4) substituted cyanoguanidines wherein the substituent is lower alkyl, phenyl, hydroxymethyl, chloromethyl, or chlorophenyl, (5) polyaminotriazoles, (6) amino-substituted s-triazines, (7) imidazolines, and (8) mixtures thereof.

6. A stabilized polyacetal resin composition comprising a high molecular weight polymer of formaldehyde having a molecular weight in the range of about 10,000 to 200,000 and a melting point above 150° C. and a stabilizer system comprising (a) 0.5 percent to 20 percent by weight, based on the weight of the formaldehyde polymer, of a polynuclear polyphenol having a benzene ring which is substituted with three 3,5-dialkyl-4-hydroxybenzyl radicals, at least one of said alkyl radicals having from 3 to 8 carbon atoms and being branched on the alpha carbon atom, and with three alkyl radicals, each of said alkyl radicals having from 1 to 4 carbon atoms, and (b) 0.05 percent to 3 percent, based on the weight of the formaldehyde polymer, of a nitrogen-containing compound selected from the group consisting of (1) superpolyamides formed by the polymerization of ω-aminomonocarboxylic acids, (2) superpolyamides formed by the condensation of dicarboxylic acids with diamines, (3) cyanoguanidine, (4) lower alkyl, phenyl, hydroxymethyl, chloromethyl, and chlorophenyl substituted cyanoguanidines, (5) polyaminotriazoles, (6) amino-substituted s-triazines, (7) imidazolines, and (8) mixtures thereof.

7. A polyacetal resin composition according to claim 6 wherein the polynuclear polyphenol is 1,3,5-trimethyl-2,4,6-tris (3,5-di-tert. butyl-4-hydroxybenzyl) benzene.

8. A polyacetal resin composition according to claim 6 wherein the nitrogen-containing compound is cyanoguanidine.

9. A polyacetal resin composition according to claim 6 wherein the nitrogen-containing compound is a superpolyamide terpolymer having a degree of polymerization of about 100 to 200 and containing about 38 percent by weight of polycaprolactam, 35 percent by weight of polyhexamethylene adipamide, and 27 percent by weight of polyhexamethylene sebacamide.

(References on following page)

References Cited
UNITED STATES PATENTS

| | | | |
|---|---|---|---|
| 3,026,264 | 3/1962 | Rocklin | 260—45.95 |
| 3,274,149 | 9/1966 | Berardinelli | 260—45.9 |
| 3,288,885 | 11/1966 | Green et al. | 260—857 |

SAMUEL H. BLECH, *Primary Examiner.*
PAUL LIEBERMAN, *Assistant Examiner.*

U.S. Cl. X.R.

260—67, 45.95, 45.9, 45.8